United States Patent [19]
Watanabe et al.

[11] 3,901,606
[45] Aug. 26, 1975

[54] NON-CONTACT TYPE DIMENSION MEASURING DEVICE

[75] Inventors: Kazuo Watanabe, Oobu; Masasi Mizuno, Ichinomiya, both of Japan

[73] Assignee: Daido Seiko Kabushiki Kaisha, Nagoya, Japan

[22] Filed: Dec. 17, 1973

[21] Appl. No.: 425,692

[30] Foreign Application Priority Data
Dec. 27, 1972 Japan............................. 48-1606

[52] U.S. Cl. ............ 356/159; 235/151.32; 250/209; 250/578; G01B/11/10
[51] Int. Cl.² ........................................ G01B 11/04
[58] Field of Search ........... 250/578, 209; 356/159, 356/156, 157, 158, 160; 235/151.3, 151.32

[56] References Cited
UNITED STATES PATENTS
3,562,500   2/1971   Grant............................. 235/151.3
FOREIGN PATENTS OR APPLICATIONS
966,408   8/1964   United Kingdom Primary Examiner—James W. Lawrence
Assistant Examiner—T. N. Grigsby
Attorney, Agent, or Firm—Bucknam and Archer

[57] ABSTRACT

Disclosed is a non-contact type dimension measuring device which comprises a light source for projecting collimated rays to an object to be measured, a convex lens for receiving the rays which are not screened by the object, to cause the rays to converge at its focal point, a first screen plate having a slit located at the focal point of the convex lens, a second screen plate having a large number of photoelectric converter elements arranged one one surface thereof on which surface an magnified image of the object is formed by the rays passing through the slit of the first screen plate, and an operational circuit responsive to electric signals from the photoelectric converter elements for determining the dimension of the object.

7 Claims, 10 Drawing Figures

NON-CONTACT TYPE DIMENSION MEASURING DEVICE

BACKGROUND OF THE INVENTION:

1. Field of the Invention

This invention relates to a non-contact type dimension measuring device, and particularly to a non-contact type dimension measuring device adapted to measure the diameter of an object which is fed at a high velocity and which is at a high temperature, such as a round steel rod during a rolling.

2. Description of the Prior Art

In raw product manufacturing processes as in the iron and steel industry, there are required measuring devices for automatically measuring the dimensions of portions of a product, used as a detection means for control of the manufacturing process and as a detection means for checking the products for quality control. If it is possible to gauge the diameter of round steel rods or steel wires during rolling or milling, the measured diameter can be fed back for adjusting the gap between the rollers to control the diameter of the steel rod. On the other hand, for example, a polished product which has been subject to die-drawing or to surface-machining after rolling is required to be accurate in its dimensions to within a severely restricted degree of tolerance. In this case, a dimension measuring system having good accuracy and efficiency is also desired.

In measuring the diameter of a product during its rolling process, since the rolling temperature is at about 1000°C and the product to be rolled is fed at a high velocity such as 30 m/sec, it is impossible to measure the product by a contact-system. Therefore, it is necessary to employ a non-contact system in measuring the product. In case of polished products, the present means for measuring the product is by using, for example, a micrometer. However, for measuring such a product over its entire length and checking the whole of it by using the micrometer, a great amount of labor is required. Therefore, it is very desirable to automatically measure the product. In order to increase the measuring efficiency, the non-contact type measuring system is better than the contact type measuring system.

In an attempt to meet the above mentioned requirements, it has, heretofore, been considered to measure the diameter of a product by using light in a non-contact manner. However, a steel rod vibrates during rolling. Therefore, in case of the steel rod being gauged by using the light during the rolling, such a vibration of the rod has heretofore been the principal cause for measurement error.

For example, in a measuring device of the slit rotating type, the collimated rays emerging from a collimated ray source consisting of a light source and a first converging lens are projected onto an object such as steel rod, and then the rays which are not screened by the steel rod are converged on one photoelectric converter element by a second converging lens. The photoelectric converter element is housed in a drum rotating at a constant velocity. The axis of rotation of this drum passes through the photoelectric converter element. The drum is provided with a slit therethrough which is rotated together with the drum to traverse the ray path extending from the second lens to the photoelectric converter element. With this arrangement, when the slit lies in the shadow of the steel rod, the photoelectric converter element receives no ray emerging from the second lens, and therefore produces no electric signal. On the other hand, when the slit is outside the shadow of the steel rod, the photoelectric converter element receives rays emerging from the second lens, and therefore produces an electric signal. Therefore, by measuring the duration over which the slit continues to be within the shadow of the steel rod (i.e. the duration over which the photoelectric converter element does not produce the electric signal), a signal proportional to the diameter of the steel rod can be obtained.

However, when the slit stays within the shadow of the steel rod, and if the rod vibrates, the shadow of the rod also vibrates. As a result, the photoelectric coverter element will produce the electric signal over a longer or shorter duration than that proportional to the actual diameter of the rod, and thereby a faulty measured valve is obtained. As is apparent from the above, vibration of the steel rod invariably caused measurement error.

In order to overcome this defect, it is necessary to rotate the slit at a very high velocity. Alternatively, the average value of numerous measured values must be derived to indicate the dimensions of the product.

If the slit of the drum is wide, the duration over which the slit stays within the shadow of the steel rod cannot be accurately measured. Thus, the width of the slit must be a width corresponding to the required precision. For example, the width of the slit must generally be 50$\mu$. In this case, however, because of such a narrow width of the slit, the photoelectric converter element can receive only a slight amount of light. Therefore, a high brightness light source should actually be used, and a high sensitive and high responsive photomultiplier tube must also used as the photoelectric converter element. For the photomultiplier tube, a high voltage source such as 1000 V voltage source is required. Furthermore, it is required to conduct forced cooling of the high brightness light source. As mentioned above, in order to obtain a sufficiently precise measured value by using the measuring systems in the prior art, the numbers of parts requiring constant maintenance attention such as high velocity rotation drums, photomultiplier tubes, high brightness light sources, etc. is increased.

SUMMARY OF THE INVENTION

One object of this invention is to provide a non-contact type dimension measuring device which is free from the defects above mentioned and in which there is no measurement error resulting from the vibration of the object to be measured and no high brightness light source and no high voltage source are required.

Another object of this invention is to provide the above mentioned non-contact type dimension measuring device in which the object to be measured is subjected to forced vibration and is repeatedly measured to minimize the digital measurement error.

According to one aspect of this invention there is provided a non-contact type dimension measuring device comprising a first optical system for projecting collimated rays onto an object to be measured, a second optical system for producing a magnified image of the object from the collimated rays emitted onto the object, a screen means having a plurality of small photoelectric connverter elements arranged thereon for reception of the magnified image of the object, and an operational circuit for receiving signals depending on the size of the magnified image from the small photoelectric converter elements to derive the dimension of the object, whereby all measurement error caused by the vibration of the object is eliminated and the measured value is indicated instantaneously.

According to another aspect of this invention there is provided a non-contact type dimension measuring device comprising a first optical system for projecting collimated rays onto the object to be measured, a second optical system for producing a magnified image of the object from the collimated rays emitted onto the object, a screen means having a plurality of small photoelectric converter elements arranged thereon for reception of the magnified image of the object, a first operational circuit for receiving signals depending on the size of the magnified image from the small photoelectric converter elements to derive the dimension of the object, means for repeatedly vibrating the object, and a second operational circuit for receiving signals indicative of the repeatedly measured value of the dimension of the object from the first operational circuit to derive an average value thereof, whereby digital measurement error caused by the interval between the small photoelectric converter elements is minimized.

The above objects and advantages and the other objects and advantages of this invention will become apparent from the detailed description of the preferred embodiments according to this invention, in conjection with the accompanying drawing.

DESCRIPTION OF THE PREFERRED EMBODIMENTS

Figure 1:
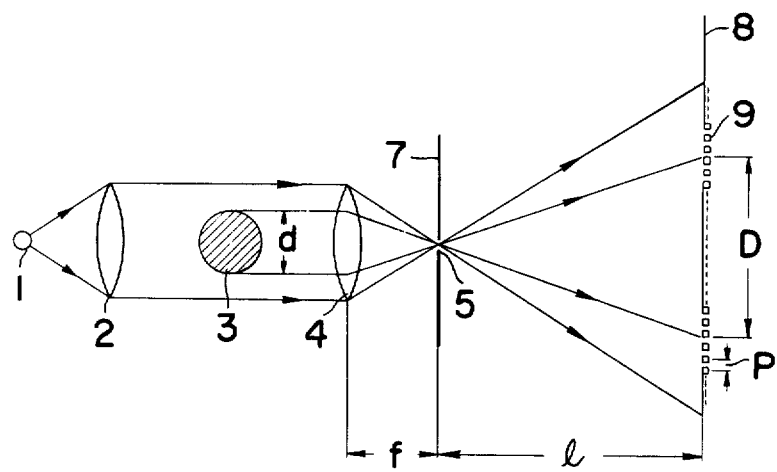
FIG. 1 is a view illustrating the principle of a non-contact type dimension measuring device according to this invention.
Figures 2, 4:
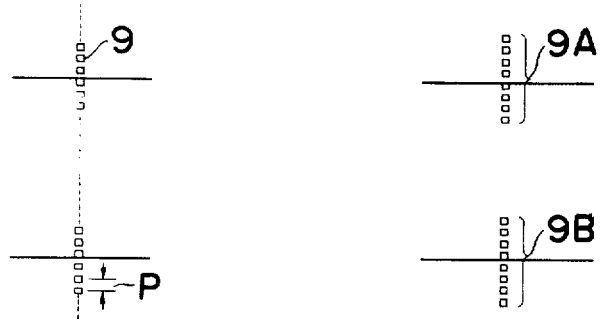
FIG. 2 is a front view of the screen of the device shown in FIG. 1 which has a plurality of photoelectric converter elements arranged thereon.
FIG. 4 is a view of another screen having the photoelectric converter elements arranged thereon to be divided into two groups.

In FIG. 1 there is diagrammatically shown one embodiment of non-contact type dimension measuring device according to this invention. This non-contact type dimension measuring device comprises a collimated ray source consisting of a light source 1 and a convex lens 2. This parallel ray source projects collimated rays onto a round steel rod 3, which is to be measured, to produce a shadow of the rod. This shadow of the steel rod produced by the collimated rays is magnified and projected by a convex lens 4 through a slit 5 of a screen plate 7 onto a screen 8. The screen 8 is provided with a plurality of photoelectric converter elements 9 arranged on the surface thereof on which surface the magnified shadow of the rod is projected. As shown in FIG. 2, a great number of photoelectric converter elements 9 are arranged in a single file on the screen 8 slightly apart from one another. In FIG. 1, assume now that the shadow portion of the steel rod 3 on the screen 8 is D. The dimension of the steel rod 3 can be measured by counting the number of photoelectric converter elements with the shadow portion D. Thus, the diameter d of the steel rod is expressed by the following equation:

$$d = np \frac{f}{l}$$

where
$f$ is the focal length of the lens 4;
$l$ is the distance from the rear focal point of the lens 4 to the screen 8;
$p$ is the interval between the photoelectric converter elements; and
$n$ is the number of photoelectric converter elements 9 within the shadow portion D.

Since $p$, $l$ and $f$ are constant, respectively, the diameter $d$ of the steel rod 3 can be obtained by determining the number of $n$. Even if the steel rod 3 is moved due to vibration, by instantaneously detecting the photoelectric converter elements 9 within the shadow portion D of the steel rod, the diameter of the steel rod can be measured without an error attributable to the vibration.

Figure 3:
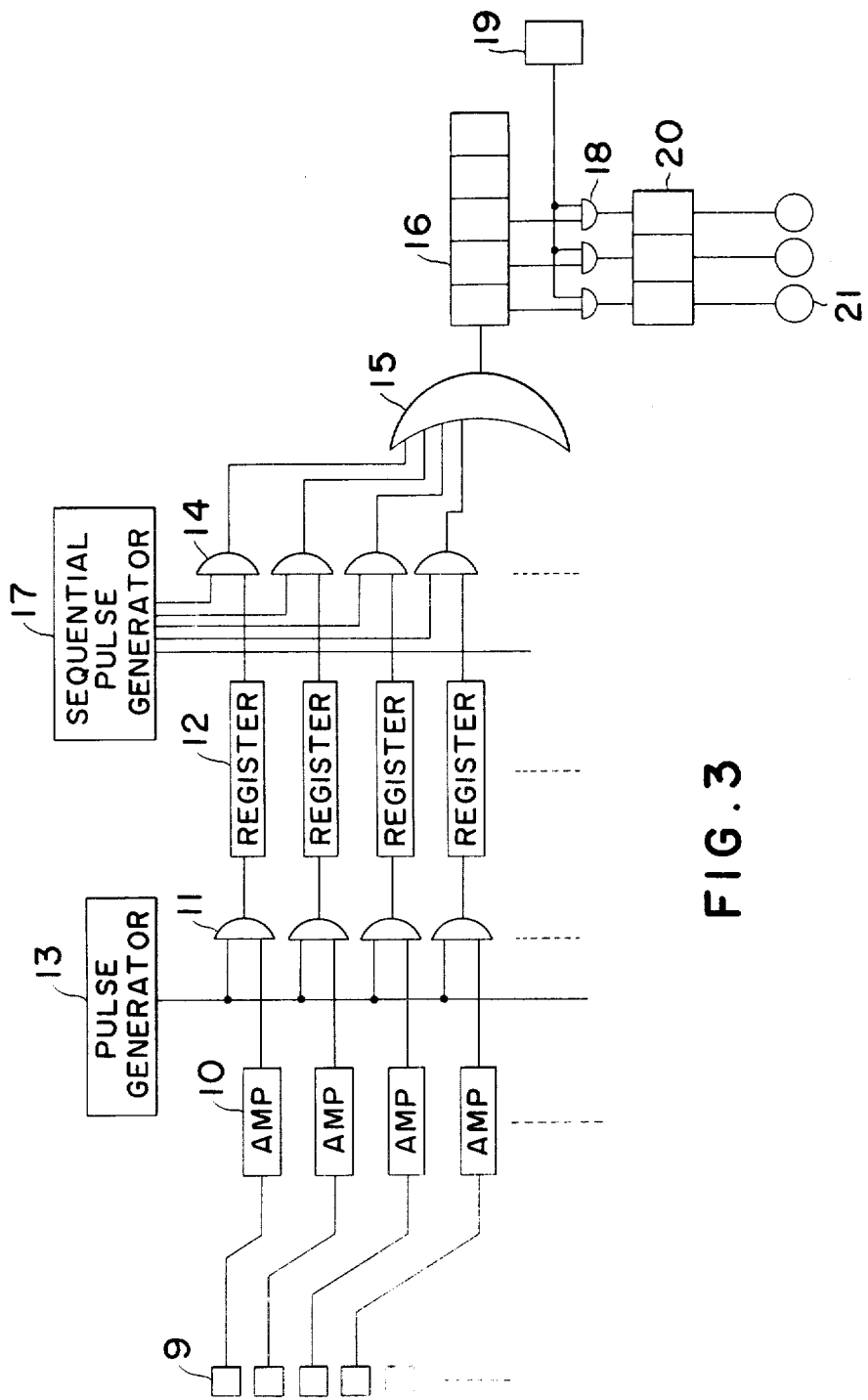
FIG. 3 is a block diagram illustrating an operational circuit for counting the number of photoelectric converter elements not irradiated by the rays.

FIG. 3 shows one preferred embodiment of an operational circuit which can instantaneously detect the photoelectric elements within the shadow portion of the steel rod. This operational circuit comprises a plurality of amplifier 10 which receive and amplify respective output voltages from the photoelectric converter elements. The respective outputs from the amplifiers 10 are fed through respective AND gate circuits 11 to respective one-bit registers 12, as shown in FIG. 3. The operational circuit is also provided with a measuring gate pulse generater 13 which simultaneously supplies a measuring gate pulse to another input of each of the AND gate circuits 11 at the instant of measuring. If the gate pulse is fed to all AND gate circuits 11 at the instant of measuring, the registers 12 corresponding to the photoelectric converter elements within the shadow portion D at that instant remain OFF, and on the other hand, the registers 12 corresponding to the photoelectric converter elements 9 outside the shadow becomes ON. This condition is maintained until the next gate pulse is fed to the AND gate circuits 11. Q outputs of the respective registers 12 are fed through the respective AND gate circuits 14 and through a single OR circuit 15 to a single counter 16, as shown in FIG. 3. Each gate circuit 14 sequentially receives a counting pulse from a sequence pulse generator 17. As a result, only the registers 12 being in OFF condition are sequentially counted by the counter 16. This counted value by the counter 16 is the number of photoelectric converter elements within the shadow portion D. If latching circuits of Transister-Transister Logic are used as the gate circuits 11, the read-in time to the registers by the gate pulse will be below one microsecond. This time is extremely shorter than the time over which the outer edge of the shadow of the steel rod is moved from one photoelectric converter element to another one by the vibration of the steel rod. Therefore, no measurement error is caused by such a vibration in the device according to this invention.

If the amplitude of the vibration of the steel rod is relatively small, it is unnecessary to array the photoelectric converter elements 9 on the whole surface of the screen 8, as shown in FIGS. 1 and 2, and then the photoelectric converter elements can be divided to two groups 9A and 9B located only on surface areas of the screen 8 in the proximity of the upper and lower edges of the shadow, as shown in FIG. 4. In this case, the diameter d of the steel rod is expressed by the following equation:

$$d = np \cdot \frac{f}{l} + C$$

where C is the distance from the lowermost photoelectric converter element of the upper group 9A to the uppermost one of the lower group 9B, divided by the magnification $1/f$.

In this case, the upper or lower edge of the shadow of the steel rod may move off from the photoelectric converter element groups 9A and 9B. In consideration of such a case, there may be provided an inhibit circuit for inhibiting the gate pulse generater from producing the measuring gate pulse when the upper or lower edge of the shadow moves off from the element groups 9A and 9B.

In the measuring device according to this invention, the measurement error is attributable to the interval of the photoelectric converter elements, and therefore, is in a digital form. This digital measurement error is expressed as follows:

$$p \cdot \frac{f}{l}$$

For example, in the dimension measuring device having 0.5 mm silicon solar batteries arrayed close to one another in which $p=0.5$ mm, $f = 50$ mm and $l = 500$ mm, the digital measurement error is 0.05 mm. As mentioned above, the measuring device according to this invention has theoretically no error attributable to the vibration of the steel rod. However, the device has some digital error attributable to the interval between the photoelectric converter elements. However, this digital error can substantially be reduced, on the basis of the principle of probability, by repeatedly measuring the steel rod and by obtaining an average value of the repeatedly measured values.

In the device according to this invention, for example, the measuring gate pulse is generated every 1/100 second, and then the device indicates the average value of 100 measured values every 1 second. In the actual embodiment, the counter 16 continues to count the measured counts 100 times, and then to shift the position of the decimal point forward two places, as shown in FIG. 3. The shifted counts are fed to a register 20 through an AND gate 18 which receives a gate pulse from a pulse generater, for example, every 1 second. Then, the shifted counts, i.e. the average values of the 100 measured values, are fed to an indicating means 21 to indicate such average values every one second. By obtaining the average values of the 100 measured values, the digital error is reduced to 0.01 mm. However, if the steel rod does not move, then the same measured value will be obtained every time. In this case, the digital error cannot reduced even if an average value is obtained from a number of measured values. However, it is very effective when the steel rod is moved, such as by vibration. Since the steel rod during rolling ordinarily vibrates ceaselessly, in measuring the diameter of such a steel, according to this invention, the digital error can be reduced by utilizing the vibration. Also, in measuring the dimensions of an object which does not ordinarily vibrate, the digital error can be reduced by forcedly vibrating the object and at the same time by repeatedly measuring it to obtain an average value from the repeatedly measured values. More specifically, in the case that the outer edge of the shadow of the steel rod is between the photoelectric converter elements, a fraction of the actual diameter of a steel rod cannot be measured by one measurement, and therefore, is contained in the measured value as error. Suppose that measurements are repeatedly performed while the steel rod is subjected to vibration. In some of these measurements the shadow of the vibrating rod covers one extra photoelectric converter element at its shadow edge, but in the other measurements it does not. The diameter of the steel rod can be precisely determined from the results of measurements respectively weighted with reference to the number of occurrences of "extra" counts and "no extra" counts. Therefore, the diameter of the steel rod can be more precisely expressed by the average value obtained from the repeatedly measured values while it is subjected to vibration.

In a product such as a polished steel rod, a measurement of its diameter is performed after a polishing process. In case of the automatic measurement of such steel rods, they are automatically fed to a measuring device one by one, and therefore, somewhat vibrate due to feeding. Thus, the diameter of the polished steel rod can also be measured while the digital error is reduced, by repeatedly performing measurements of the diameter and obtaining an average value from these measurements.

Figure 5:
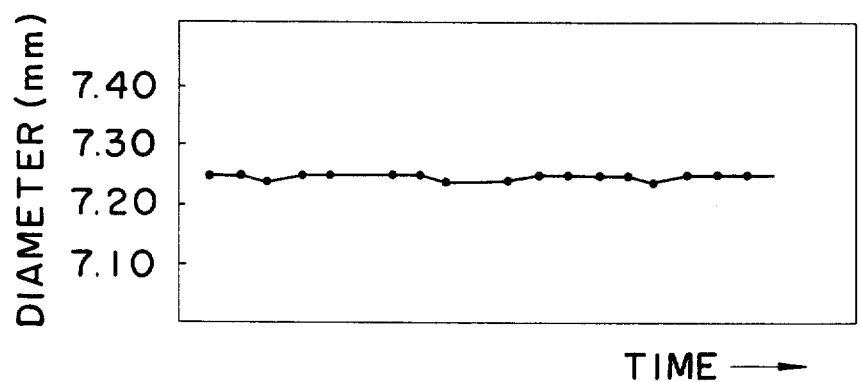
FIGS. 5 and 6 are graphs illustrating measured values of steel rods obtained by using embodiments of this invention, respectively.

FIG. 5 exemplifies measured values of the diameter of a vibrating steel rod obtained by using the measuring device according to this invention. In this case, the amplitude of the vibration of the steel rod is 10 mm and the frequency thereof is 15 Hz. And, the actual diameter of the steel rod measured by means of a micrometer is 7.25 mm. As shown in FIG. 5, the measurement error is 0.01 mm. This shows that satisfactorily precise measured values can be obtained by using the measuring device according to this invention.

Figure 6:
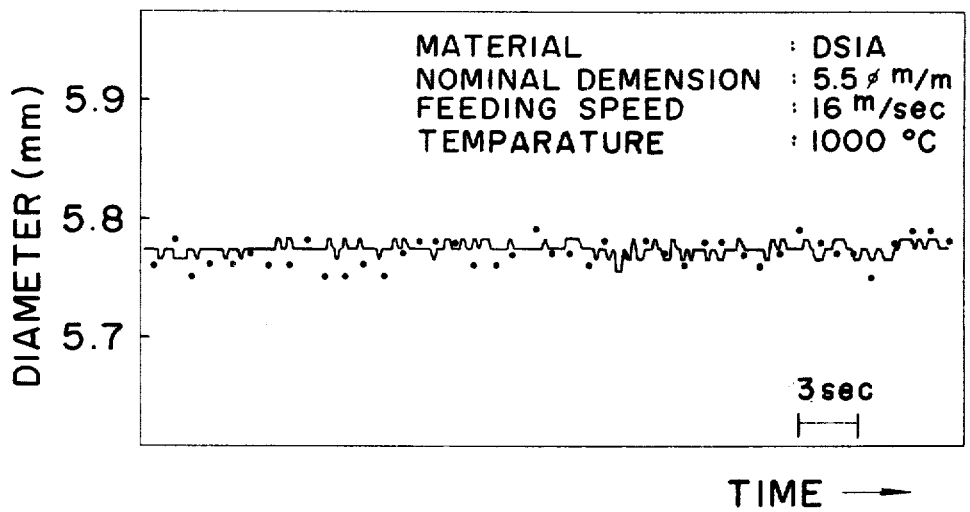

Turning to FIG. 6, the solid line therein shows another example of measured values of the diameter of a vibrating steel wire rod obtained by using the device according to this invention. Dots in FIG. 6 show the measured values obtained by using a micrometer. It should be noted that is the measurement by the micrometer there is scattering attributable to variation in the measuring position of the micrometer against the wire rod. As will be noted from FIG. 6, accurate and reliable measurement can be obtained by use of a device according to this invention.

Figure 7:
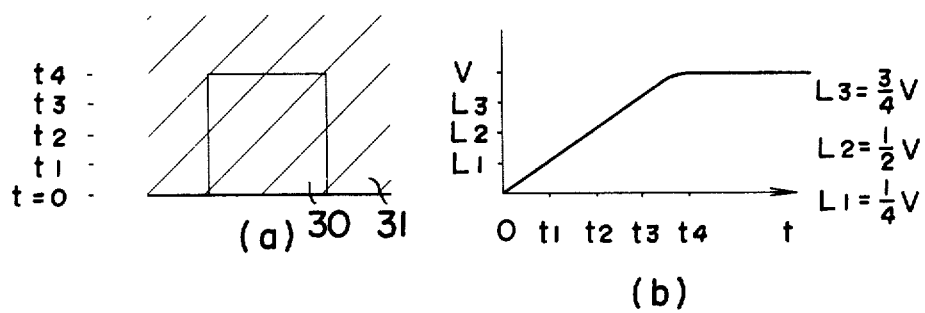
FIG. 7a shows one photoelectric converter element fully lying in the shadow of an object with the edge of the shadow being in alignment with one side of the element.
FIG. 7b is a graph showing the input-to-output signal relation in a photoelectric converter element.

As is well known an electric output signal from a photoelectric converter element varies linearly with a light-incidence area of the element. Suppose that the whole incidence area of a photoelectric converter element 30 is fully covered by the shadow 31 of an object (see FIG. 7a). The lower edge of the shadow 31 happens to be in alignment with the lower side of the element 30 ($t = 0$). In this instance, the photoelectric converter element 30 produces no electric output signal. As the lower edge of the shadow 31 gradually shifts upward, the optical input to the photoelectric element will increase, and hence the electric output signal will accordingly increase, as shown in FIG. 7b (the input photo signal being given in terms of time). When the element 30 gets fully outside of the shadow 31 ($t = t_4$), the output signal reaches its maximum and saturation value.

Suppose that two Schmitt trigger circuits having different threshold values corresponding to the levels $L_2$ $$\left(=\frac{1}{2}V\right) \text{ and } V$$

(see FIG. 7b), are connected to the output of each of the amplifiers 10. And, suppose that the output of each of these Schmitt trigger circuits is connected to one input of each of the AND gates 11. This structure is equivalent to an apparatus using photoelectric elements a half as small and two times as many as the photoelectric elements 9 in FIG. 3. As mentioned earlier, the digital error can be expressed as a function of the size of the photoelectric element (which size is equal to the center-interval between adjacent photoelectric elements) and the distance $l$ from the slit to the screen. In the structure modified above the size of the photoelectric element is reduced to a half in effect, although the physical size of the element remains unchanged. If the "slit-to-screenn" distance $l$ is not changed, the use of these "apparently small" photoelectric elements will halve the digital error which would be caused in the apparatus of FIG. 3.

Alternatively, the inputs of four Schmitt trigger circuits having threshold values corresponding to the levels $$L_1\left(=\frac{1}{4}V\right), L_2\left(=\frac{1}{2}V\right), L_3\left(=\frac{3}{4}V\right) \text{ and } V$$

(see FIG. 7b), are connected to the output of each of the amplifiers 10, and the output of each of these Schmitt trigger circuits is connected to an AND gate circuit 11. In this instance the measurement accuracy will be much improved. In fact, it will be the same as in case where four quarter-size photoelectric converter elements would be used in place of each element 9 in the circuit of FIG. 3. Therefore, the digital error could be reduced to one quarter.

Figure 8:
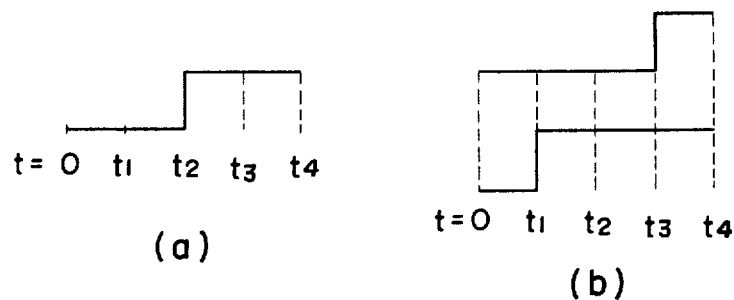
FIGS. 8a and 8b show the input-to-output signal relations of Schmitt trigger circuits having different threshold levels.

FIG. 8 shows the input-to-output signal relations of the Schmitt trigger circuits having threshould levels corresponding to $L_1$, $L_2$ and $L_3$ in FIG. 7b. Abscissas are input signals given in terms of time, whereas ordinates are output signals.

If use is made of an operational circuit modified as above, and if the slit-to-screen distance $l$ is made as short as half or one-fourth, the digital error $p(f/l)$ will not be changed. Thus, the slit-to-screen distance $l$ can be shortened without lowering the measurement accuracy and at the same time, without increasing the number of the photoelectric elements and associated amplifiers. This means the substantial reduction of the whole size of the apparatus. Furthermore, as a result of slit-to-screen distance being reduced, the amount of light allotted to one photoelectric converter element, and hence the output of the element increases. Therefore, it suffices that low-gain amplifiers are used in the apparatus. This means that the apparatus will be free from the unstability which would be introduced by high-gain amplifiers which otherwise would be used.

While this invention has been described with reference to the image of an object magnified on the screen, it should be understood that this invention is equally applied if the image of the object is minified on the screen.

As seen from the above, the diameter of a steel rod can be precisely determined by using a lens system to magnify the image of the rod and simultaneously by detecting the upper and lower edges of the magnified image. Even if the steel rod vibrates, its diameter can be exactly determined. Also, in the gauging apparatus according to this invention, any rotating part such as a rotating slitted drum is not essentially required. Furthermore, as silicon solar batteries are used as photoelectric converter elements, a high voltage source is not required. The gauging apparatus using 0.5 mm-square silicon solar batteries were responsive to a light of relatively low brightness for satisfactory operation. Thank to these advantages the measuring apparatus according to this invention requires only a minimum of maintenance, and assures excellent reliability. In case where an object to be measured vibrates, a digital error due to the physical size of the photoelectric element can be minimized by repeating measurements and averaging their results.

Although this invention has been explained above with respect to the measurement of the diameter of a round steel rod, it can be equally applied to the measurement of the width of a sheet material.

What is claimed is:

1. A non-contact type dimension measuring device comprising:
    a first optical system for projecting collimated rays onto an object to be measured;
    a screen means having a plurality of photoelectric converter elements arranged in a plane;
    a second optical system for producing an image of said object on said screen means; and
    an operational circuit responsive to signals representing the size of said magnified image from said photoelectric converter elements for calculating the dimension of said object;
    means for repeatedly vibrating said object; and
    a second operational circuit repeatedly receiving signals indicative of the measured value of the dimension of the object from said first operational circuit for caluculating an average value thereof.

2. A non-contact type dimension measuring device according to claim 1, wherein said first optical system has a light source and a converging lens having a focal point located on said light source.

3. A non-contact type dimension measuring device according to claim 1, wherein said second optical system has a converging lens between which and said first optical system the object to be measured is positioned, and a screen having a slit located at the rear focal point of said lens.

4. A non-contact type dimension measuring device according to claim 1, wherein said first operational circuit comprises:
  a plurality of amplifiers each connected to the output of each of the photoelectric converter elements;
  a plurality of first AND gate each having one input connected to the output of each of said amplifiers;
  a pulse generator for simultaneously supplying a pulse signal to the other input of each of said first AND gates;
  a plurality of registers each having a input connected to the reverse output of each of said first AND gates;
  a plurality of second AND gates each having one input connected to the output of each of said registers;
  a sequential pulse generator having a plurality of outputs each connected the other input of each of said second AND gates;
  an OR gate having a plurality of input each connected to the output of each of said second AND gates; and
  a counter connected to the output of said OR gate, and wherein the second operational circuit comprises;
  a plurality of AND gates one input of each of which is connected to one of the digits of said counter of said first operational circuit excepting at least the least significant digit;
  a pulse generator for periodically supplying a pulse signal to the other input of each of said AND gates;
  a counter connected to the output of each of said AND gates; and
  a display means connected to said counter for periodically displaying an average value of measurement.

5. A non-contact type dimension measuring device comprising:
  a first optical system for projecting collimated rays onto an object to be measured;
  a screen means having a plurality of photoelectric converter elements arranged in a plane;
  a second optical system for producing an image of said object on said screen means; and
  an operational circuit responsive to signals representing the size of said magnified image from said photoelectric converter elements for calculating the dimension of said object, said operational circuit comprising:
  a plurality of amplifiers each connected to the output of each of the photoelectric converter elements;
  a plurality of first AND gate each having one input connected to the output of each of said amplifiers;
  a pulse generater for simultaneously supplying a pulse signal to the other input of each of said first AND gates;
  a plurality of registers each having an input connected to the reverse output of each of said first AND gates;
  a plurality of second AND gates each having one input connected to the output of each of said registers;
  a sequential pulse generator having a plurality of outputs each connected the other input of each of said second AND gates;
  an OR gate having a plurality of inputs each connected to the output of each of said second AND gates;
  a counter connected to the output of said OR gate; and
  a display means connected to said counter.

6. A non-contact type dimension measuring device according to claim 5, wherein said operational circuit further comprises Schmitt trigger circuits having at least two different threshold values, inputs of at least two Schmitt trigger circuits having threshold values different from one another being connected to the output of each of said amplifiers, and an output of each of said at least two Schmitt trigger circuits being connected to the output of each of said first AND gates.

7. A non-contact type dimension measuring device comprising:
  a first optical system for projecting collimated rays onto an object to be measured;
  a screen means having a plurality of photoelectric converter elements arranged in a plane;
  a second optical system for producing an image of said object on said screen means;
  a first operational circuit responsive to signals representing the size of said magnified image from said photoelectric converter elements for calculating the dimension of said object, and a second operational circuit repeatedly receiving signals indicative of the measured value of the dimension of the object from said first operational circuit for calculating an average value thereof,
said first operational circuit comprising:
  a plurality of amplifiers each connected to the output of each of the photoelectric converter elements;
  a plurality of first AND gates each having one input connected to the output of each of said amplifiers;
  a pulse generator for simultaneously supplying a pulse signal to the other input of each of said first AND gates;
  a plurality of registers each having an input connected to the reverse output of each of said AND gates;
  a plurality of second AND gates each having one input connected to the output of each of said registers;
  a sequential pulse generator having a plurality of outputs each connected the other input of each of said second AND gates;
  an OR gate having a plurality of inputs each connected to the output of each of said second AND gates; and
  a counter connected to the output of said OR gate, and wherein the second operational circuit comprises:
  a plurality of AND gates one input of each of which is connected to one of the digits of said counter of said first operational circuit excepting at least the least significant digit;
  a pulse generator for periodically supplying a pulse signal to the other input of each of said AND gates;
  a counter connected to the output of each of said AND gates; and
  a display means connected to said counter for periodically displaying an average value of measurement.

* * * * *